United States Patent Office 2,758,133
Patented Aug. 7, 1956

2,758,133

SULFOMETHYL FATTY UREAS AND THEIR PREPARATION

John G. Erickson, Minneapolis, Minn., assignor to General Mills, Inc., a corporation of Delaware No Drawing. Application February 29, 1952, Serial No. 274,290

11 Claims. (Cl. 260—513)

The present invention relates to new compounds having the following formula

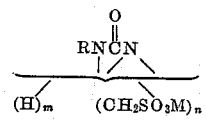

where R is an aliphatic hydrocarbon group containing from 8 to 22 carbon atoms, M is alkali metal or ammonium, $m$ is 0, 1 or 2, $n$ is 1, 2 or 3, and the sum of $m$ and $n$ is equal to 3.

These compounds have a variety of properties depending upon the character and number of the substituents. Some of these products are useful as waterproofing agents for textiles, while others possess surface-active properties and may therefore be used as wetting agents, emulsifying agents, and the like.

It is therefore an object of the present invention to provide novel compounds having the above formula.

It is also an object of the present invention to provide a novel process of producing such compounds.

The compounds of the present invention may be prepared by the reaction of fatty ureas with formaldehyde and bisulfite, or with the addition product of formaldehyde and bisulfite. The reactions are indicated as follows:

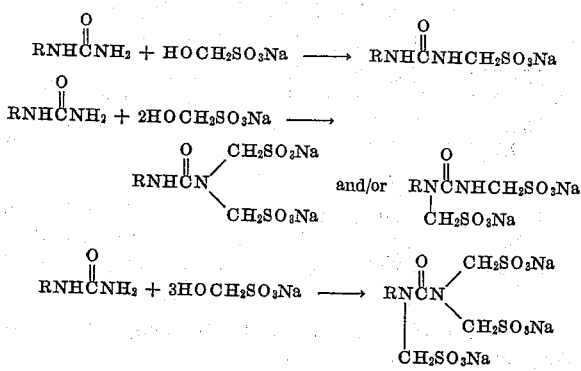

The fatty ureas employed in the present invention may be derived from fatty amines, which in turn may be derived from fatty acids. In the preparation of the amines, fatty acids containing from 8 to 22 carbon atoms may be employed. These may be the mixed fatty acids of a fat or oil or may be any isolated fatty acid or group of fatty acids. Similarly, the fatty acids may be either saturated or unsaturated or mixtures thereof. Accordingly the R group in the fatty ureas in the above formulas may be an aliphatic hydrocarbon group containing from 8 to 22 carbon atoms and may be either saturated or unsaturated.

Of the various products of the present invention those containing a single sulfomethyl group are virtually insoluble in hot or cold water. When deposited on cloth from alcoholic solution they render the fabric resistant to wetting. The products containing two sulfomethyl groups are relatively insoluble in cold water but dissolve in hot water, giving solutions which possess very good foaming characteristics. These compounds are useful for their surface-active properties. The products containing three sulfomethyl groups are soluble in cold water and the solutions foam readily. These products can likewise be used for their surface-active properties.

The reaction between fatty urea and the formaldehyde-bisulfite is most conveniently carried out in a solvent. The most suitable solvents are those which dissolve both the fatty urea and the formaldehyde-bisulfite. It has been found that glycols are useful for this purpose. Suitable glycols include ethylene glycol, propylene glycol, and butylene glycol. It is also possible to carry out the reaction in the presence of a solvent, such as xylene, which dissolves only one of the reagents. This, however, tends to slow down the reaction and to some extent limit the number of sulfomethyl groups which may be introduced.

The number of sulfomethyl groups which can be introduced depends largely upon the temperature and the length of heating. The introduction of the first sulfomethyl group may be accomplished by heating the reaction mixture for 3 to 4 hours at 60–70° C.; the second sulfomethyl group by heating from 10 to 20 hours at 80–100° C. The third sulfomethyl group may be introduced by heating the reaction mixture for 10 to 20 hours at temperatures of 115–130° C. The product may be recovered from the reaction mixture by cooling the reaction mixture, filtering off the product, and then washing the product free of solvent by means of a further solvent, such as dioxane.

*Example 1*

A mixture of 15.6 parts of octadecylurea, 6.7 parts of formaldehyde-sodium bisulfite addition product and 64 parts of xylene was refluxed for several hours at 115–120° C., cooled and filtered. The product was washed with water, then with hot ethyl acetate, yielding sodium octadecylureidomethanesulfonate, a white solid. When applied to canvas from alcohol solution, it considerably increased the resistance of the cloth to wetting.

*Example 2*

A mixture of 11.9 parts of dodecylurea, 20.1 parts of formaldehyde-sodium bisulfite addition product was heated for 17 hours at 80–90° C. in ethylene glycol solution. It was cooled, acetonitrile was added and the product was filtered off and washed with acetonitrile. This gave 17.1 parts of a mixture of the disodium salts of bis(sulfomethyl)dodecylurea, shown in preceding equations. The products are white solids which are not very soluble in cold water but dissolve readily in hot water, giving solutions which foam readily.

*Example 3*

A mixture of 12 parts of dodecylurea, 24.8 parts of formaldehyde-sodium bisulfite and 111 parts of ethylene glycol was heated at 125° C. for 10 hours and the product was washed with dioxane. This gave 20.5 parts of the trisodium salt of dodecyltris(sulfomethyl)urea, a white solid, readily soluble in cold water. Its solutions possessed good foaming power.

Instead of forming the formaldehyde-bisulfite addition product separately, these materials may be added directly to the reaction mixture and the formaldehyde-bisulfite addition reaction allowed to take place in the presence of the fatty urea. In place of the sodium salts, the potassium or ammonium bisulfite salts may be used.

I claim as my invention:

1. Compounds having the following formula

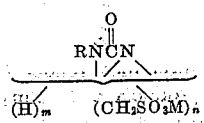

where R is a straight chained aliphatic hydrocarbon group linked to the nitrogen atom at the terminal carbon atom containing from 8 to 22 carbon atoms, M is selected from the group consisting of alkali metals and ammonium, $m$ is from 0 to 2, $n$ is from 1 to 3, and the sum of $m$ and $n$ is equal to 3.

2. Compounds having the following formula

in which R is a straight chained aliphatic hydrocarbon group linked to the nitrogen atom at the terminal carbon atom containing from 8 to 22 carbon atoms, and M is an alkali metal.

3. Compounds having the following formula

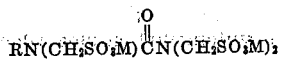

in which R is a straight chained aliphatic hydrocarbon group linked to the nitrogen atom at the terminal carbon atom containing from 8 to 22 carbon atoms, and M is an alkali metal.

4. Sodium octadecylureidomethanesulfonate.

5. Trisodium salt of dodecyltris(sulfomethyl)urea.

6. A mixture of compounds having the following formulas:

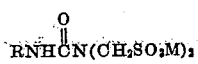

and

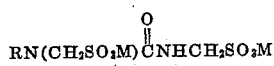

in which R is an aliphatic hydrocarbon group containing from 8 to 22 carbon atoms and M is an alkali metal.

7. A mixture of the following compounds:

$C_{12}H_{25}NHCON(CH_2SO_3Na)_2$ and
$C_{12}H_{25}N(CH_2SO_3Na)CONHCH_2SO_3Na$

8. Process of preparing compounds having the following formula:

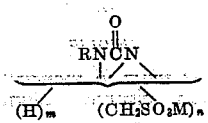

where R is a straight chained aliphatic hydrocarbon group linked to the nitrogen atom at the terminal carbon atom containing from 8 to 22 carbon atoms, M is selected from the group consisting of alkali metals and ammonium, $m$ is from 0 to 2, $n$ is from 1 to 3, and the sum of $m$ and $n$ is equal to 3, which comprises reacting the corresponding urea, $RNHCONH_2$, with the corresponding formaldehyde bisulfite, $HOCH_2SO_3M$, at a temperature within the approximate range of 60–130° C., for a time period of from about 3–20 hours, the higher temperatures and the longer time periods being employed for the higher degrees of sulfonation.

9. Process of producing compounds having the following formula:

in which R is a straight chained aliphatic hydrocarbon group linked to the nitrogen atom at the terminal carbon atom containing from 8 to 22 carbon atoms, and M is an alkali metal, which comprises reacting the corresponding urea, $RNHCONH_2$, with the corresponding formaldehyde bisulfite, $HOCH_2SO_3M$, at a temperature within the approximate range of 60–70° C. for from 3–4 hours.

10. Process of producing a mixture of compounds having the following formulas:

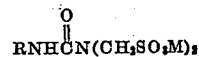

and

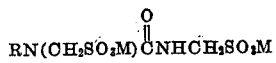

in which R is a straight chained aliphatic hydrocarbon group linked to the nitrogen atom at the terminal carbon atom containing from 8 to 22 carbon atoms, and M is an alkali metal, which comprises reacting the corresponding urea $RNHCONH_2$ with the corresponding formaldehyde bisulfite $HOCH_2SO_3M$ at a temperature within the approximate range of 80–100° C. for from 10–20 hours.

11. Process of producing compounds having the following formula:

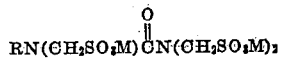

in which R is a straight chained aliphatic hydrocarbon group linked to the nitrogen atom at the terminal carbon atom containing from 8 to 22 carbon atoms, and M is an alkali metal, which comprises reacting the corresponding urea $RNHCONH_2$ with the corresponding formaldehyde bisulfite $HOCH_2SO_3M$ at a temperature within the approximate range of 115–130° C. for from 10–20 hours.

References Cited in the file of this patent

UNITED STATES PATENTS

| | | |
|---|---|---|
| 2,251,892 | Orthner et al. | Aug. 5, 1941 |
| 2,255,082 | Orthner et al. | Sept. 9, 1941 |
| 2,366,452 | Mack | Jan. 2, 1945 |
| 2,479,782 | Sallmann | Aug. 23, 1949 |

FOREIGN PATENTS

| | | |
|---|---|---|
| 802,142 | France | June 6, 1936 |
| 510,318 | Great Britain | July 25, 1939 |
| 209,334 | Switzerland | July 16, 1940 |

OTHER REFERENCES

Rodd: Chemistry of Carbon Compounds, vol. 1, part A, p. 596 (1951).